(12) United States Patent
Harvey et al.

(10) Patent No.: US 9,671,976 B2
(45) Date of Patent: Jun. 6, 2017

(54) DATA MANAGEMENT SYSTEM FOR MANAGING STORAGE OF DATA ON PRIMARY AND SECONDARY STORAGE

(75) Inventors: Peter Harvey, Shorncliffe (AU); Michael Harvey, Erskineville (AU); Rudi Bierach, Strathpine (AU); Mark Wharton, Windsor (AU)

(73) Assignee: Moonwalk Universal Pty Ltd, Milton, QLD (AU)

( * ) Notice: Subject to any disclaimer, the term of this patent is extended or adjusted under 35 U.S.C. 154(b) by 569 days.

(21) Appl. No.: 12/525,746

(22) PCT Filed: Feb. 5, 2008

(86) PCT No.: PCT/AU2008/000133
§ 371 (c)(1),
(2), (4) Date: Nov. 24, 2009

(87) PCT Pub. No.: WO2008/095237
PCT Pub. Date: Aug. 14, 2008

(65) Prior Publication Data
US 2010/0106686 A1    Apr. 29, 2010

(30) Foreign Application Priority Data
Feb. 5, 2007    (AU) .............................. 2007900540

(51) Int. Cl.
*G06F 3/06* (2006.01)
*G06F 17/30* (2006.01)

(52) U.S. Cl.
CPC .......... *G06F 3/0647* (2013.01); *G06F 3/0608* (2013.01); *G06F 17/30079* (2013.01); *G06F 17/30153* (2013.01)

(58) Field of Classification Search
USPC ................................................ 707/655, 660
See application file for complete search history.

(56) References Cited

U.S. PATENT DOCUMENTS

| 6,269,382 B1 | 7/2001 | Cabrera et al. |
| 6,449,615 B1 | 9/2002 | Liu et al. |
| (Continued) | | |

FOREIGN PATENT DOCUMENTS

WO    2008095237    8/2008

OTHER PUBLICATIONS

Sunderam V et al: "Lightweight self-organizing frameworks for metacomputing", High Performance Distributed Computing, 2002. HPDC—Nov. 2002. Proceeding S, 11th IEEE International Symposium on Jul. 23-26, 2002, Piscataway, NJ, USA,IEEE Jul. 23, 2002 (Jul. 23, 2002), pp. 113-122, XP010601167, ISBN: 978-0-7695-1686-8.

(Continued)

*Primary Examiner* — William Spieler
(74) *Attorney, Agent, or Firm* — Williams Mullen, PC; Thomas F. Bergert

(57) ABSTRACT

A data management system for managing the storage of data on primary and secondary storage from a primary information source having original file content to be stored including: a data file stub stored on primary storage; a data file stored on secondary storage; and wherein: the data file stub comprises original file meta data and additional stub meta data relevant to the data file; the data file comprises the original file content and additional file meta data relevant to the data file stub; the additional stub meta data includes location and information relevant to locate and recover the data file; the additional file meta data includes information relevant to the location and content of the stub; the additional stub meta data and additional file meta data being so formed and arranged that the data to be stored may be accessed without stateful middleware.

20 Claims, 1 Drawing Sheet

(56) References Cited

U.S. PATENT DOCUMENTS

| | | | |
|---|---|---|---|
| 6,804,719 B1 | 10/2004 | Cabrera et al. | |
| 7,165,059 B1* | 1/2007 | Shah et al. | |
| 7,962,709 B2* | 6/2011 | Agrawal | 711/162 |
| 8,549,121 B2* | 10/2013 | Nocera et al. | 709/223 |
| 2002/0069280 A1 | 6/2002 | Bolik et al. | |
| 2002/0161855 A1* | 10/2002 | Manczak et al. | 709/219 |
| 2004/0049513 A1* | 3/2004 | Yakir et al. | 707/100 |
| 2004/0083202 A1* | 4/2004 | Mu et al. | 707/3 |
| 2005/0071560 A1 | 3/2005 | Bolik et al. | |
| 2006/0212481 A1 | 9/2006 | Stacey et al. | |
| 2008/0148295 A1* | 6/2008 | Freimuth et al. | 719/324 |

OTHER PUBLICATIONS

IP Australia, International Search Report and Written Opinion, PCT/AU2008/000133, Jun. 13, 2008.

Intellectual Property Office of New Zealand, "Examination Report" for New Zealand Patent Application No. 578689, Mar. 9, 2011.

Applicant's Response, New Zealand Patent Application No. 578689, Mar. 25, 2011.

Intellectual Property Office of New Zealand. "Examination Report" for New Zealand Patent Application No. 578689, Apr. 13, 2011.

Applicant's Response, New Zealand Patent Application No. 578689, Aug. 26, 2011.

Applicant's Response to European Patent Office, European Patent Application No. 08700428.9, Jul. 22, 2011.

IP Australia. "Examiner's First Report on Patent Application No. 2008213892 by Moonwalk Universal Pty Ltd", Dec. 2, 2011.

Applicant's Response to Written Opinion, PCT/AU2008/000133, Dec. 8, 2008.

IP Australia, International Report on Patentability, PCT/AU2008/000133, Dec. 17, 2008.

European Patent Office, Extended European search report, European Patent Application No. 08700428.9, May 6, 2011.

European Patent Office, Communication from Examining Division, European Patent Application No. 08700428.9, Jan. 22, 2013.

* cited by examiner

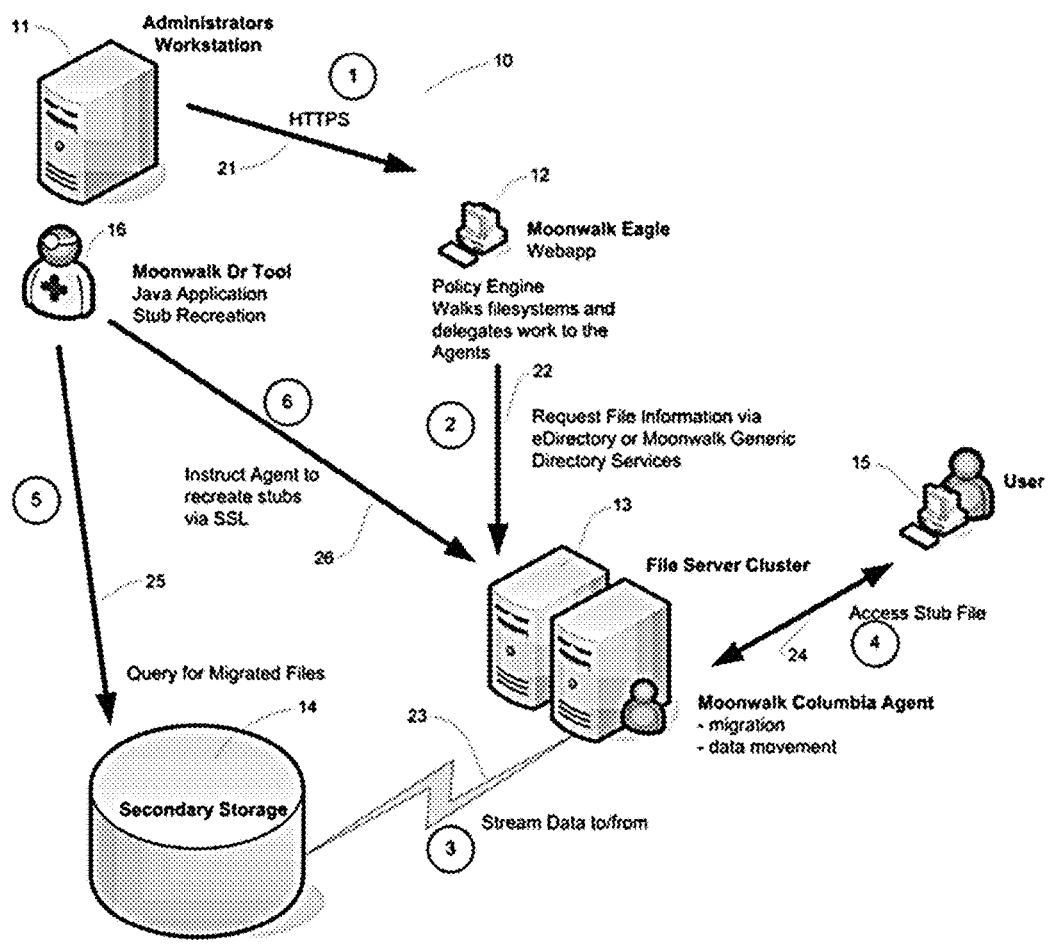

DATA MANAGEMENT SYSTEM FOR MANAGING STORAGE OF DATA ON PRIMARY AND SECONDARY STORAGE

FIELD OF INVENTION

THIS INVENTION relates to a data management system. The invention has particular application to a data management system for the migration, copying and/or movement of electronically stored information within and between different electronic data storage systems or elements within such systems, but maintaining substantially seamless accessibility to the information by users. The invention also has particular application to hierarchical storage management, but the invention is not limited to this field of use.

BACKGROUND ART

The use of electronic storage of information has long had the problem that once information becomes "historical" and is no longer required to be changed, it is inefficient and expensive to store such information on "primary storage"—that storage which the system, usually a computer system, uses for creation, correction and/or manipulation of the information to be stored ultimately as a permanent record. Accordingly, electronically stored information is often "archived", requiring migration of the data to "secondary storage". Additionally, even information which is relatively newly created, but which is infrequently accessed, may be relegated to secondary storage. Typically, secondary storage has slower access and longer retrieval times than primary storage, but since the demand for the information stored thereon is relatively low, such lower performance specifications do not normally impact upon accessibility of the information.

However, present systems involving the migration of data from primary to secondary storage employ some form of "stateful middleware", be it in the form of servers, databases, indexes or such like. Stateful middleware thus introduces an additional layer, thereby creating another point of potential failure and has a significant impact on scalability and/or ease of scalability. The mode of potential failure is not necessarily a failure to store information on secondary storage, but a failure in the stateful middleware application software preventing data retrieval.

With hierarchical storage management (HSM), present systems involve migration of data using stateful middleware. In practice, HSM is typically performed by dedicated software, such as that known by the trade marks "CommVault", "DataMigrator" or "VERITAS Enterprise Vault". Such "stateful middleware" creates an additional layer having the shortcomings previously described. HSM systems known in the art may sometimes be described as utilizing centralized management. However, such systems do not provide for delegation of tasks to agents from a single machine, but employ a login model whereby the user manages any number of management servers individually from a single login point, an expensive administration and configuration overhead.

In this specification, unless the context requires otherwise, the term "data" may be taken to encompass information stored in electronic or electronically readable form. The term also may be taken to encompass data stored in all data object types and/or file types, including, but not limited to, binary large objects (blobs), files and any data representation type unless the context requires otherwise. In this specification, unless the context requires otherwise, the singular shall incorporate the plural and the plural shall incorporate the singular.

The present invention aims to provide a data management system which alleviates at least one of the problems of the prior art, or at least provide a cost effective alternative to existing systems. Other aims and advantages of the invention may become apparent from the following description.

DISCLOSURE OF THE INVENTION

With the foregoing in view, the present invention in one aspect resides broadly in a data management system comprising virtual hierarchical storage management without stateful middleware and selected to provide the features of control channel, data channel, demigration requiring only data channel stateless server agents and no stateful middleware. Suitably, all data transfers are streamed directly to the target device. Suitably, the data management system includes stubs. In such form, the stubs constitute stub-to-file content mapping which includes both meta data and data content. The stubs are globally meaningful stubs, whereby a stub by itself is sufficient to locate and recover content from secondary storage. Suitably, the stubs have a technology neutral representation. Suitably, stubs can be moved between systems without demigrating. In such form, the stubs can be moved to and from different operating systems, thereby providing efficient moving without demigration between servers. Suitably, the data management system uses centralised management and distributed execution.

In another aspect, the present invention resides broadly in a data management system for managing the storage of data on primary and secondary storage from a primary information source having original file content to be stored including:

a data file stub stored on primary storage;
    a data file stored on secondary storage;
    and wherein:
    the data file stub comprises original file meta data and additional stub meta data relevant to the data file;
    the data file comprises the original file content and additional file meta data relevant to the data file stub;
    the additional stub meta data includes location information relevant to locate and recover the secondary data file;
    the additional file meta data includes information relevant to the location and content of the data file stub;
    the additional stub meta data and additional file meta data being so formed and arranged that the data to be stored may be accessed without stateful middleware.

Preferably, the data management system includes software operable on one or more computers for creating the data file stub and data file from a primary information source having original file content to be stored.

In another aspect, the present invention resides broadly in a method of data management for managing the storage of data on primary and secondary storage including:

creating a data file stub and a data file from a primary information source having original file content to be stored;
    generating additional stub meta data relevant to the data file for inclusion in the data file stub with the original file meta data, the additional stub meta data including locations and information relevant to the data file;
    generating additional file meta data relevant to the stub for inclusion in the data file with the original file content to be stored, the additional file meta data including information relevant to the data file stub;

storing the data file stub with the additional stub meta data included on primary storage;

storing the data file with the additional file meta data included on secondary storage;

the additional stub meta data and the additional file meta data including information sufficient to permit access to the original file content using the additional stub meta data and without stateful middleware.

In another aspect, the present invention resides broadly in a method of data management for managing the storage of data on primary and secondary storage including:

providing and executing software on one or more computers to create a data file stub and a data file from a primary information source having original file content to be stored;

generating additional stub meta data relevant to the data file for inclusion in the data file stub, the additional stub meta data including locations and information relevant to the data file;

generating additional file meta data relevant to the data file stub for inclusion in the data file with the original file content to be stored, the additional file meta data including information relevant to the data file stub;

storing the data file stub with the additional stub meta data included on primary storage;

transferring the data file with the additional file meta data included for storage on secondary storage, the data transfer being streamed directly to the target device; and wherein the additional stub meta data and the additional file meta data include information sufficient to permit access to the original file content using the additional stub meta data and without stateful middleware.

It will be appreciated that the creation of the data file requires the transfer of data from the primary storage to the secondary storage, the data transfer preferably being streamed directly to the target device as opposed to staging, thereby substantially eliminating risk of data loss due to intermediate stages failing. The streaming may be permitted through a multi-proxy chain. Suitably, the software uses distributed execution over the one or more computers, the one or more computers being preferably operatively connected to form a computer network.

In another aspect, the present invention resides broadly in a method of data management for managing the storage of data on primary and secondary storage including:

providing and executing software on one or more computers to create a data file stub and a data file from a primary information source having original file content to be stored using centralised management with distributed execution over the one or more computers, generating additional stub meta data relevant to the data file for inclusion in the data file stub with the original file meta data, the additional stub meta data including locations and information relevant to a the data file;

generating additional file meta data relevant to the data file stub for inclusion in the data file with the original file content to be stored, the additional file meta data including information relevant to the data file stub;

storing the data file stub with the additional stub meta data included on primary storage;

storing the data file with the additional file meta data included on secondary storage;

the additional stub meta data and additional file meta data including information sufficient to permit access to the original file content using the additional stub meta data and without stateful middleware.

The meta data may precede, follow or be embedded in the data stream, or be arranged as a header, footer or integrated into the information to be stored, or otherwise be embedded in the data stream in the case of the additional file meta data.

In order to provide the necessary rules and policies, the software suitably incorporates a centralised data management repository whereby the software may be executed according to select rules appropriate for the agent through which the information to be stored may be accessed. Of course, there may be more than one agent involved in this process, but it will be appreciated that both the original and additional file meta data may be required to include sufficient information to permit the agent or agents to provide substantially transparent access to the information to be stored.

Suitably, the system provides for transparent retrieval (demigration). In such form, the agents can demigrate by themselves without reliance on any other management control or instruction. The symmetric nature of the information contained in the stub and the migrated file allows for reverse mapping back to the stub therefore allowing for generation of the stub from the migrated file on secondary storage thus providing the basic foundation for the Disaster Recovery functionality. It will be seen that the symmetric nature of the information contained in the stub and migrated file allows for movement of stubs without demigration.

The system may also incorporate compression of the data for storage and/or transmission.

BRIEF DESCRIPTION OF THE DRAWINGS

In order that the invention may be more readily understood and put into practical effect, reference will now be made to the accompanying drawing exemplifying an embodiment of the invention and wherein:

The drawing FIGURE is a diagrammatic representation of a data management system according to the invention.

DETAILED DESCRIPTION OF THE DRAWINGS

A typical operating environment for the data management system 10 illustrated in the drawing FIGURE includes an administrator's workstation 11 which may be used to access a policy engine 12 via HTTPS represented by arrow 21. A file server cluster 13 is operatively connected to secondary storage 14 represented by the lightning line 23. The policy engine is operatively connected to the file server cluster as represented by arrow 22. A user 15 is operatively connected to the file server cluster as represented by the double headed arrow 24. The Disaster Recovery Tool designated by the trade name "Moonwalk Dr Tool" 16 is also operatively connected to the server cluster and secondary storage as represented by arrows 26 and 25 respectively.

The data management system illustrated as described in the paragraph immediately previous may be better understood and put into practical effect by reference to its operational qualities as described hereinafter. For clarity, reference made to encircled reference numerals depicted in the drawing FIGURE will be indicated by use of parenthesis in the description.

In use, the systems administrator accesses the policy engine (Eagle) via HTTPS (1) and creates the various rules and policies for data management which are then deployed as per the schedule. The Policy Engine then walks the target file systems via either eDirectory or a Generic Directory Services (GDS) to accumulate the information required to perform the tasks scheduled. (2). Having the appropriate file information, the policy engine then delegates tasks to the agents residing on the application servers (2).

A file subject to the particular delegated task has additional metadata including that relating to its current location and its new location attached to it and it is then streamed directly to the target secondary storage (3) using secure SSL.

Once the file has been successfully transferred, the agent is notified and it in turn deletes the original file content thus creating a Stubfile in the original File location, the Stubfile containing all the metadata pertaining to the original file and including that additional metadata necessary to access the migrated file now residing on the secondary storage.

When a User accesses the file (4) at the original location, the application sees the Stubfile as logically the same as the original file because all the metadata is preserved. The additional metadata however, alerts the agent to the fact that the actual file is residing at the other location. The agent then retrieves the file and streams it directly back to its original location (3) transparently to any application or the user using only the metadata encapsulated in the both the Stubfile and the migrated file without reference to information contained in any other source/location such as an index or database.

The symmetric encapsulation of the additional metadata on both Stubfile and migrated file enables disaster recovery in the event of Stubfile loss or corruption. If a user cannot access a file due to a corrupt or lost Stubfile, the Moonwalk Dr Tool queries the migrated files on the relevant secondary storage for the file in question (5) and then instructs the agent to recreate the Stubfile on the relevant primary storage location. The user can then continue to access the file via the new Stubfile (4).

Although the invention has been described with reference to specific examples, it will be appreciated by those skilled in the art that the invention may be embodied in other forms within the broad scope and ambit of the invention as herein set forth and provisionally defined by the following claims.

The claims provisionally defining the invention are as follows:

1. A system for storage, retrieval and management of data on primary and secondary storage from a primary information source having original file content to be stored, retrieved and managed, comprising:
   a primary storage;
   a secondary storage; and
   one or more computer processors adapted to execute a program stored in a computer memory, the program being operable to provide instructions to the one or more computer processors including providing virtual hierarchical storage management using the primary and secondary storage without stateful middleware and selected to provide the features of control channel, data channel, demigration from the secondary storage requiring only data channel stateless server agents and no stateful middleware, wherein the virtual hierarchical storage management pertains to a data file stub stored on the primary storage and a data file stored on the secondary storage, wherein the data file stub comprises original file meta data and additional file meta data relevant to the data file, wherein the data file comprises original file content and additional stub meta data relevant to the data file stub, and wherein, in the event that the data file stub is inoperable, the program queries the data file stored on the secondary storage and instructs at least one of the stateless server agents to recreate the data file stub on the primary storage.

2. The system of claim 1 wherein data transfers are streamed directly to a target device.

3. The system of claim 1 wherein the original content is stored as a migrated file and includes stubs having stub-to-datastream mapping and datastream-to-stub mapping.

4. The system according to claim 3, wherein the stubs are globally meaningful stubs, whereby a stub by itself is sufficient to locate and recover content from secondary storage.

5. The system of claim 3, wherein the information contained in the stub is of a symmetric nature with respect to the information contained in the migrated file whereby reverse mapping of the information back to the stub is enabled.

6. The system of claim 5, wherein the stub can be generated from the migrated file on secondary storage.

7. The system according to claim 3, wherein the information contained in the stub and the migrated file is of a symmetric nature thereby allowing for reverse mapping back to the stub.

8. The system according to claim 7, wherein the symmetric nature of the information is so formed as to allow for generation of the stub from the migrated file on secondary storage.

9. The system according to claim 7, wherein the symmetric nature of the information is so formed as to further provide a basic foundation for disaster recovery functionality.

10. The system according to claim 7, wherein the symmetric nature of the information contained in the stub and the migrated file is formed to allow for movement of stubs without demigration.

11. The system according to claim 3, including agents capable of demigrating by themselves without reliance on any other management control, instruction, or any data source apart from the metadata contained within the stub and its associated migrated file.

12. The system of claim 1, wherein the additional stub meta data includes location information relevant to locate and recover the data file, and wherein the additional file meta data includes information relevant to the location and content of the stub.

13. The system of claim 1 further including centralised management and distributed execution.

14. A data management system for managing the storage of data on primary and secondary storage from a primary information source having original file content to be stored including:
   a data file stub stored on primary storage;
   a data file stored on secondary storage;
   and wherein:
      the data file stub comprises original file meta data and additional stub meta data relevant to the data file;
      the data file comprises the original file content and additional file meta data relevant to the data file stub;
      the additional stub meta data includes location information relevant to locate and recover the data file;
      the additional file meta data includes information relevant to the location and content of the stub;
      the additional stub meta data and additional file meta data being so formed and arranged that the data to be stored may be accessed without stateful middleware.

15. The data management system according to claim 14, and including software operable on one or more computers for creating the data file stub and data file from a primary information source having original file content to be stored.

16. The data management system according to claim 15 and including a centralised data management repository whereby the software may be executed according to select rules appropriate for an agent through which information to be stored may be accessed.

17. A method of data management for managing the storage of data on primary and secondary storage including:
    creating a data file stub and a data file from a primary information source having original file content to be stored;
    generating additional stub meta data relevant to the data file for inclusion in the data file stub with the original file meta data, the additional stub meta data including location information relevant to the data file;
    generating additional file meta data relevant to the stub for inclusion in the data file with the original file content to be stored, the additional file meta data including information relevant to the data file stub;
    storing the data file stub with the additional stub meta data included on primary storage;
    storing the data file with the additional file meta data included on secondary storage;
    and wherein the additional stub meta data and the additional file meta data include information sufficient to permit access to the original file content using the additional stub meta data and without stateful middleware.

18. The method according to claim 17, including agents demigrating by themselves without reliance on any other management control, instruction, or any data source apart from the metadata contained within the stub and its associated migrated file.

19. A method of data management for managing the storage of data on primary and secondary storage including:
    providing and executing software on one or more computers to create a data file stub and a data file from a primary information source having original file content to be stored;
    generating additional stub meta data relevant to the data file for inclusion in the data file stub, the additional stub meta data including location information relevant to the data file;
    generating additional file meta data relevant to the data file stub for inclusion in the data file with the original file content to be stored, the additional file meta data including information relevant to the data file stub;
    storing the data file stub with the additional stub meta data included on primary storage;
    transferring the data file with the additional file meta data included for storage on secondary storage, the data transfer being streamed directly to a target device;
    and wherein the additional stub meta data and the additional file meta data include information sufficient to permit access to the original file content using the additional stub meta data and without stateful middleware.

20. A method of data management for managing the storage of data on primary and secondary storage including:
    providing and executing software on one or more computers to create a data file stub and a data file from a primary information source having original file content to be stored using centralised management with distributed execution over the one or more computers,
    generating additional stub meta data relevant to the data file for inclusion in the data file stub with the original file meta data, the additional stub meta data including location information relevant to the data file;
    generating additional file meta data relevant to the data file stub for inclusion in the data file with the original file content to be stored, the additional file meta data including information relevant to the data file stub;
    storing the data file stub with the additional stub meta data included on primary storage;
    storing the data file with the additional file meta data included on secondary storage;
    and wherein the additional stub meta data and additional file meta data include information sufficient to permit access to the original file content using the additional stub meta data and without stateful middleware.

* * * * *